(12) United States Patent
Offord et al.

(10) Patent No.: US 8,524,157 B2
(45) Date of Patent: Sep. 3, 2013

(54) CONTAINER HAVING AN OXYGEN SCAVENGING ACTIVATION SYSTEM

(75) Inventors: David Offord, Hayward, CA (US); John G. Brace, Saline, MI (US); Terry D. Patcheak, Ypsilanti, MI (US)

(73) Assignee: Amcor Limited, Hawthorn (AU)

( * ) Notice: Subject to any disclaimer, the term of this patent is extended or adjusted under 35 U.S.C. 154(b) by 65 days.

(21) Appl. No.: 13/042,904

(22) Filed: Mar. 8, 2011

(65) Prior Publication Data

US 2011/0223069 A1 Sep. 15, 2011

Related U.S. Application Data

(60) Provisional application No. 61/313,163, filed on Mar. 12, 2010.

(51) Int. Cl.
*F01N 3/20* (2006.01)
*B65D 81/28* (2006.01)

(52) U.S. Cl.
USPC ........... 422/105; 422/129; 422/162; 422/167; 422/239; 422/211; 428/35.7; 428/36.9; 206/213.1

(58) Field of Classification Search
USPC ................. 422/105, 129, 162, 187, 239, 211; 428/35.7, 36.9; 206/213.1
See application file for complete search history.

(56) References Cited

U.S. PATENT DOCUMENTS

| | | | | |
|---|---|---|---|---|
| 3,419,400 A | * | 12/1968 | Hayhurst et al. | 426/124 |
| 3,811,999 A | * | 5/1974 | Fleischer et al. | 428/131 |
| 4,013,422 A | * | 3/1977 | Spinner et al. | 422/211 |
| 4,279,350 A | | 7/1981 | King | |
| 5,735,984 A | * | 4/1998 | Hoff et al. | 156/73.3 |
| 5,804,236 A | | 9/1998 | Frisk | |
| 6,454,965 B1 | | 9/2002 | Ching et al. | |
| 2004/0071885 A1 | | 4/2004 | Hutchinson et al. | |
| 2005/0087452 A1 | | 4/2005 | McAnalley et al. | |
| 2009/0074611 A1 | | 3/2009 | Monzyk et al. | |
| 2009/0220717 A1 | | 9/2009 | Wilczak et al. | |
| 2010/0028499 A1 | | 2/2010 | Rule et al. | |
| 2012/0114529 A1 | * | 5/2012 | Carmichael et al. | 422/105 |

FOREIGN PATENT DOCUMENTS

| | | |
|---|---|---|
| EP | 0758611 | 2/1997 |
| WO | WO 00/54866 | * 3/2000 |
| WO | WO 2006/112958 | 10/2006 |
| WO | WO 2008/090354 | 7/2008 |
| WO | WO 2010/115992 | 10/2010 |
| WO | WO 2010/116192 | 10/2010 |

* cited by examiner

*Primary Examiner* — Walter D Griffin
*Assistant Examiner* — Lessanework Seifu
(74) *Attorney, Agent, or Firm* — Harness, Dickey & Pierce, P.L.C.

(57) ABSTRACT

A polyethylene terephthalate container having a hydrogen generator and catalyst disposed or otherwise incorporated in components of the container. The container further comprises an activation system or means for activating the hydrogen generator and/or catalyst system at a predetermined time or in response to a predetermined stimulus.

8 Claims, 1 Drawing Sheet

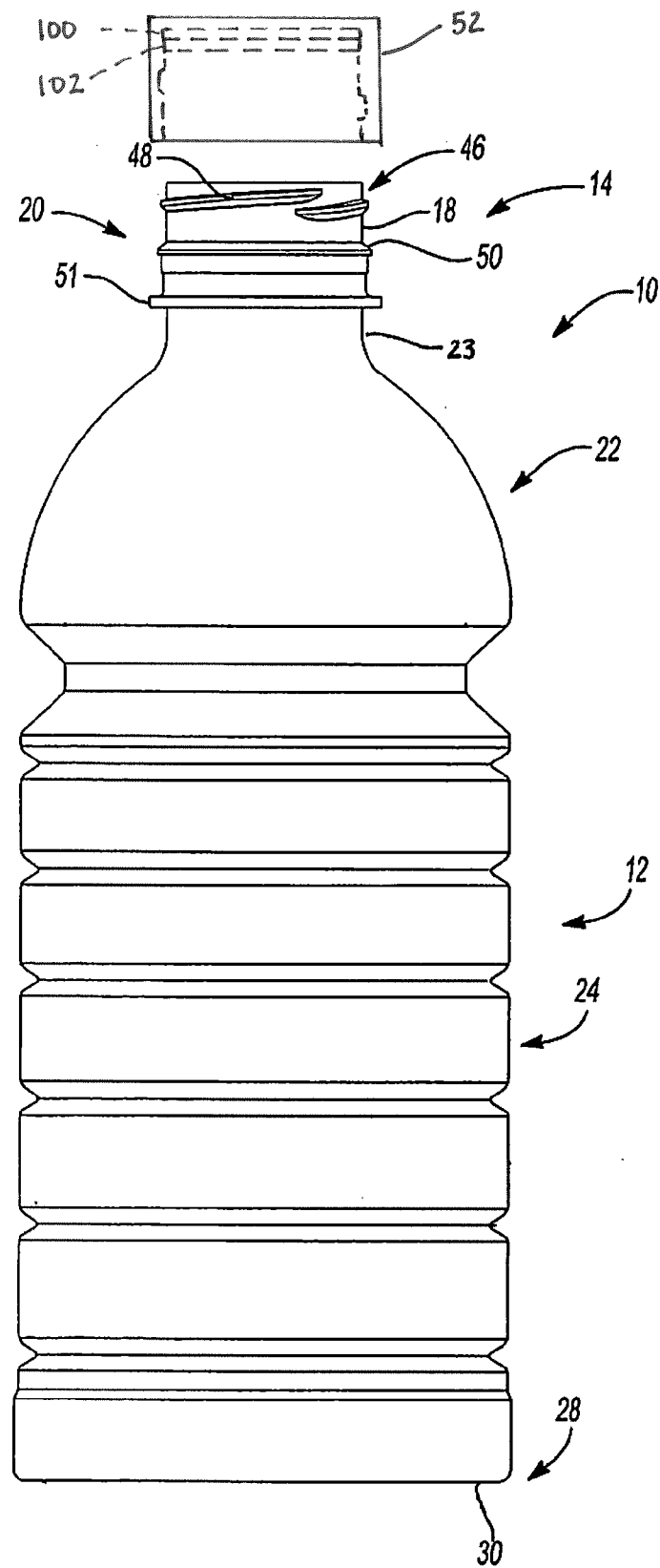

CONTAINER HAVING AN OXYGEN SCAVENGING ACTIVATION SYSTEM

CROSS-REFERENCE TO RELATED APPLICATIONS

This application claims the benefit of U.S. Provisional Application No. 61/313,163, filed on Mar. 12, 2010. The entire disclosure of the above application is incorporated herein by reference.

FIELD

This disclosure generally relates to containers for retaining a commodity, such as a solid or liquid commodity. More specifically, this disclosure relates to a polyethylene terephthalate (PET) container having an activation system for use with an oxygen scavenging system having a hydrogen generator and a catalyst.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Unfortunately, PET is a poor barrier to oxygen. One of the main factors that limit the shelf life of foods and beverages (herein known as "fills") in PET containers is the ingress of oxygen through the walls of the container followed by oxidation of the fill. Many strategies have been employed to reduce the amount of oxygen in contact with food in PET containers. Some strategies include headspace replacement, which replaces oxygen in the headspace during packaging with an inert gas, such as $N_2$ or $CO_2$. Alternative strategies include using package barrier coatings, such as chemical vapor deposited (CVD) aluminum oxide or silicon oxide. Still further, some strategies include the use of embedded barrier layers, such as multilayer packages, or PET barrier additives that create physical barriers to oxygen diffusion through the packaging (e.g., nylon, nanoclays). Finally, some strategies have used oxygen scavengers that react with oxygen in a predetermined way (e.g., oxidizable plastics, hydrogen gas, reactive metals and organic molecules) to minimize its effect, which usually requires the use of a catalyst.

An example of oxygen reducing technology is available from ColorMatrix (herein known as "Hy-Guard Technology"; International Publication Number WO 2008/090354 A1, which is hereby incorporated by reference). The technology involves the slow release of hydrogen from the container using a hydrogen generator such as sodium borohydride that releases hydrogen on exposure to water according to the following reaction:

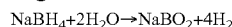

The hydrogen subsequently reacts with oxygen in the presence of a metal catalyst (e.g., palladium) to create water. The hydrogen that does not react with oxygen will slowly permeate out of the container.

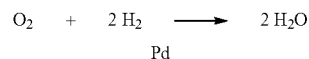

However, the ColorMatrix system fails to teach or suggest a method to minimize or eliminate the release or generation of hydrogen prior to the filling of the container. That is, the prior art system fails to prevent the generation of hydrogen by the components of the hydrogen generator when the container is stored prior to filling and sealing. Therefore, during this time, the life of the hydrogen generator is being reduced without an associated benefit of the system. This can negatively effect the functioning of the system and limit its usefulness and application, because it may not maximize the shelf life of the product contained within the container.

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

According to the principles of the present teachings, a PET container is provided having a hydrogen generator and catalyst disposed or otherwise incorporated in components of the container. The container further comprises an activation system or means for activating the hydrogen generator and/or catalyst system at a predetermined time or in response to a predetermined stimulus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a side view of an exemplary container incorporating the features of the present teachings.

Corresponding reference numerals indicate corresponding parts throughout the several views of the drawings.

DETAILED DESCRIPTION

Example embodiments will now be described more fully with reference to the accompanying drawing. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This disclosure provides for a container being made of PET and incorporating a hydrogen generator 100 and catalyst component. The container of the present teachings controls and/or reduces the effect of oxygen penetrating the container material and entering the commodity or fill contained therein. The container of the present teachings further comprises a hydrogen generator activation system 102 (e.g. barriers described herein) for delaying the release of hydrogen from the hydrogen generator and container. This should prevent or at least minimize the loss of hydrogen during storage of the hydrogen generator component prior to association with the container and/or product fill. Consequently, the shelf life of the fill will be increased due to the longer hydrogen generation lifespan. Moreover, the teachings of the present disclosure should help minimize the generation of flammable hydrogen gas that can accumulate in containers used to store the package components containing the hydrogen generator before filing and sealing.

It should be appreciated that the size and specific configuration of the container may not be particularly limiting and, thus, the principles of the present teachings can be applicable to a wide variety of PET container shapes. Therefore, it should be recognized that variations can exist in the present embodiments. That is, it should be appreciated that the teachings of the present disclosure can be used in a wide variety of containers, including reusable/disposable packages including resealable plastic bags (e.g., ZipLock® bags), resealable containers (e.g., TupperWare® containers), dried food containers (e.g., dried milk), drug containers, and oxygen-sensitive chemical packaging.

Accordingly, the present teachings provide a plastic, e.g. polyethylene terephthalate (PET), container generally indicated at 10. The exemplary container 10 can be substantially elongated when viewed from a side. Those of ordinary skill in the art would appreciate that the following teachings of the present disclosure are applicable to other containers, such as rectangular, triangular, pentagonal, hexagonal, octagonal, polygonal, or square shaped containers, which may have different dimensions and volume capacities. It is also contemplated that other modifications can be made depending on the specific application and environmental requirements.

As shown in FIG. 1, the exemplary plastic container 10 according to the present teachings defines a body 12, and includes an upper portion 14 having a cylindrical sidewall 18 forming a finish 20. Integrally formed with the finish 20 and extending downward therefrom is a shoulder portion 22. The shoulder portion 22 merges into and provides a transition between the finish 20 and a sidewall portion 24. The sidewall portion 24 extends downward from the shoulder portion 22 to a base portion 28 having a base 30. In some embodiments, sidewall portion 24 can extend down and nearly abut base 30, thereby minimizing the overall area of base portion 28 such that there is not a discernable base portion 28 when exemplary container 10 is uprightly-placed on a surface.

The exemplary container 10 may also have a neck 23. The neck 23 may have an extremely short height, that is, becoming a short extension from the finish 20, or an elongated height, extending between the finish 20 and the shoulder portion 22. The upper portion 14 can define an opening for filling and dispensing of a commodity stored therein. Although the container is shown as a drinking container, it should be appreciated that containers having different shapes, such as sidewalls and openings, can be made according to the principles of the present teachings.

The finish 20 of the exemplary plastic container 10 may include a threaded region 46 having threads 48, a lower sealing ridge 50, and a support ring 51. The threaded region provides a means for attachment of a similarly threaded closure or cap 52. Alternatives may include other suitable devices that engage the finish 20 of the exemplary plastic container 10, such as a press-fit or snap-fit cap for example. Accordingly, the closure or cap 52 engages the finish 20 to preferably provide a hermetical seal of the exemplary plastic container 10. The closure or cap 52 is preferably of a plastic or metal material conventional to the closure industry and suitable for subsequent thermal processing.

As described herein, although the prior art provides a good method for scavenging oxygen from a closed container, it fails to teach or suggest a mechanism or method for delaying the release of hydrogen from the hydrogen generator until a desired time. Providing such mechanism and/or method can provide at least two distinct advantages. Firstly, it is desirable to manufacture the package component containing the hydrogen generator and then store them for days, weeks, or months before the fill is introduced and the package sealed. During storage, the hydrogen generator will react with water in the air creating hydrogen. This hydrogen causes a fire hazard if it accumulates to greater than 4% in air unless considerations are made to safely vent the hydrogen. A first benefit of the present teachings is that it provides a mechanism and method for avoiding such hydrogen contamination and fire potential. Secondly, by delaying the release of hydrogen until the fill is packaged and sealed, a lower-capacity hydrogen generator can be used to achieve the same shelf life compared to the prior art. Conversely, the same capacity hydrogen generator would give a longer shelf life if hydrogen generation is delayed until packaging of the fill.

The present teachings provide a mechanism and method (activation system 102) for triggering the release of hydrogen at a predetermined time, such as before, during, or after the fill is placed in the container and sealed. To this end, the activation system 102 can be selected with one of the following trigger mechanisms, such as but not limited to use of a pH trigger, temperature trigger, high-energy beam trigger, solvent trigger, magnetic trigger, light trigger, ultrasonic trigger, plasma etch trigger, removable physical barrier trigger, mechanical force trigger (such as a microcapsule rupture or barrier rupture), vacuum trigger, fuse trigger, or the like.

In greater detail, in some embodiments, a pH trigger can be used to activate the hydrogen generator at a predetermined time. To this end, in some embodiments, high pH sodium borohydride can be used. In the absence of a catalyst, sodium borohydride's reaction with water is slowed at pH greater than 7. The higher the pH, the slower the sodium borohydride will react with water to form hydrogen gas. At pH 14, sodium borohydride is completely unreactive towards water. Therefore, if sodium borohydride is deposited from high pH water on a solid support and dried, it will remain inactive until the solid is contacted with a lower pH material or a catalyst such as Ru or Pt.

In some embodiments, this pH trigger can be a pH sensitive porous barrier. The pH porous barrier can be used to protect the hydrogen generator from water using a material whose water porosity increases based on pH change.

In some embodiments, a temperature trigger barrier can be used to activate the hydrogen generator at a predetermined time. In some embodiments, the temperature trigger barrier can be based on the principles of delamination or dewetting. That is, a water barrier can be used that, when heated or cooled, delaminates or dewets, exposing the hydrogen generator. Specifically, in some embodiments the hydrogen generator can be covered with a protective layer that can be removed, delaminated, dewetted, dissolved, or otherwise removed to expose the hydrogen generator to moisture, thus activating the hydrogen generator and catalyst system for scavenging oxygen from fill.

In some embodiments, the temperature trigger barrier can be based on the principles of crystalline to amorphous transition. That is, it should be understood that most polymers are better water barriers in their crystalline state. A barrier or protective layer can be applied to the hydrogen generator in the crystalline state. When activation of the system is desired, the hydrogen generator can be revealed by heating the barrier to convert it from a crystalline state to a porous, amorphous state.

In some embodiments, the temperature trigger barrier can be based on the principles of evaporation. A barrier or protective layer having a low boiling or sublimation temperature can be applied to the hydrogen generator. When activation of the system is desired, the hydrogen generator can be revealed by heating the barrier to boil or sublimate it to effect removal thereof.

In some embodiments, the temperature trigger barrier can be based on the principles of decomposition. A barrier or protective layer that decomposes to a gas, such as sodium carbonate to carbon dioxide, can be applied to the hydrogen generator. When activation of the system is desired, the hydrogen generator can be revealed by heating the barrier to decompose it to effect removal thereof. The present embodiment can further be used for vacuum compensation depending on the timing and amount used.

In some embodiments, a high energy beam trigger can be used to activate the hydrogen generator at a predetermined time. In some embodiments, the high energy beam, such as those used to sterilize packaging, can be used to perforate or decompose the barrier layer made of a suitable material, such as those described herein or known in the art, thus activating the hydrogen generator and catalyst system for scavenging oxygen from fill.

In some embodiments, a solvent trigger can be used to activate the hydrogen generator at a predetermined time. In some embodiments, the solvent can be used to dissolve the barrier layer made of a corresponding material, such as those described herein or known in the art, thus activating the hydrogen generator and catalyst system for scavenging oxygen from fill.

In some embodiments, a magnetic trigger can be used to activate the hydrogen generator at a predetermined time. In some embodiments, the magnet can be used to increase the porosity or remove a magnetically-susceptible barrier, such as those known in the art, thus activating the hydrogen generator and catalyst system for scavenging oxygen from fill.

In some embodiments, a light trigger can be used to activate the hydrogen generator at a predetermined time. In some embodiments, the light, namely the ultraviolet light or other light bandwidth, can be used to increase the permeability of a photosensitive barrier, such as those known in the art, thus activating the hydrogen generator and catalyst system for scavenging oxygen from fill.

In some embodiments, an ultrasonic trigger can be used to activate the hydrogen generator at a predetermined time. In some embodiments, the ultrasound can be used to rupture or compromise a frangible barrier, such as those known in the art, thus activating the hydrogen generator and catalyst system for scavenging oxygen from fill.

In some embodiments, a plasma etch trigger can be used to activate the hydrogen generator at a predetermined time. In some embodiments, the plasma can be used to perforate or remove a barrier, thus activating the hydrogen generator and catalyst system for scavenging oxygen from fill.

In some embodiments, a removable physical barrier can be used to activate the hydrogen generator at a predetermined time. In some embodiments, the removable physical barrier can be affixed to the hydrogen generator, such as through an adhesive connection, mechanical connection, chemical connection, and the like. The removable physical barrier can thus be peeled, unscrewed, or otherwise removed to reveal the hydrogen generator. In some embodiments, the removable physical barrier can be a sticker, removable cap liner, screw-in cap plug, or any other device providing a removable connection.

In some embodiments, a mechanical trigger can be used to activate the hydrogen generator at a predetermined time. In some embodiments, the mechanical trigger can be based on a microcapsule rupture principle. An encapsulated hydrogen capsule, which serves as the hydrogen generator in the present teachings, can be mechanically ruptured by pressing, scratching, ultrasound, or by the action of screwing the container closure on to the container, or any other rupturing or degrading process.

In some embodiments, the mechanical trigger can be a barrier that protects and/or conceals or contains the hydrogen generator. This barrier can be mechanically ruptured using mechanical principles outlined above, including pressing, scratching, ultrasound, or by the action of screwing the container closure on to the container.

Similarly, in some embodiments, a plurality of inert materials can be combined to create a hydrogen generator. In this way, one or more of the plurality of inert materials can be separately encapsulated such that when the encapsulations are broken as described herein the materials combine to form the hydrogen generator, potentially through chemical combinations.

In some embodiments, a vacuum trigger can be used to activate the hydrogen generator at a predetermined time. A byproduct of the hot-fill process used to fill many containers today is the creation of a vacuum within the container. This vacuum often exerts force on the body of the container. This vacuum force can, in some embodiments, be used to rupture or remove a protective barrier extending over a hydrogen generator, thereby activating the hydrogen generator in response to the filling of the container.

In some embodiments, a fuse or time-based trigger can be used to activate the hydrogen generator at a predetermined time. The fuse or time-based trigger can, over time, define a permeable barrier, thus permitting a predetermined container storage time prior to filling of the container.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A container comprising:
   a body having a finish;
   a closure member releasably engageable with said finish;
   a hydrogen generator generating molecular hydrogen, said hydrogen generator being coupled to said closure member;
   a catalyst catalyzing a chemical reaction between said hydrogen and oxygen; and
   an activation system selectively delaying said hydrogen generator from generating said molecular hydrogen until exposure to a trigger, said activation system having a physical barrier formed over at least a portion of said hydrogen generator that is selectively removable from said hydrogen generator by said trigger.

2. The container according to claim 1 wherein said trigger of said activation system comprises a temperature trigger.

3. The container according to claim 2 wherein said temperature trigger comprises a material disposed over at least a portion of said hydrogen generator, said material delaminating, dewetting, transitioning from crystalline to amorphous, evaporating, or decomposing in response to thermal energy.

4. The container according to claim 1 wherein said trigger of said activation system comprises a high energy beam trigger perforating or decomposing a barrier formed over at least a portion of said hydrogen generator.

5. The container according to claim 1 wherein said trigger of said activation system comprises a light trigger increasing a permeability of a barrier formed over at least a portion of said hydrogen generator in response to a predetermined bandwidth of light.

6. The container according to claim 1 wherein said trigger of said activation system comprises a plasma etch trigger perforating or decomposing a barrier formed over at least a portion of said hydrogen generator in response to plasma treatment.

7. The container according to claim 1 wherein said trigger of said activation system comprises a vacuum trigger causing a barrier formed over at least a portion of said hydrogen generator to be altered in response to a vacuum force.

8. The container according to claim 7 wherein said vacuum force is generated in response to a hot-fill operation.

* * * * *